United States Patent [19]

Pellaton

[11] 4,342,930
[45] Aug. 3, 1982

[54] STEP-BY-STEP MINIATURE MOTOR FOR WATCH MOVEMENT

[75] Inventor: Michel H. Pellaton, Besancon, France

[73] Assignee: France Ebauches S.A., Valdahon, France

[21] Appl. No.: 184,801

[22] Filed: Sep. 8, 1980

[30] Foreign Application Priority Data

Sep. 6, 1979 [FR] France .................. 79 22724

[51] Int. Cl.³ ............................................ H02K 37/00
[52] U.S. Cl. ............................ 310/49 R; 310/40 MM; 310/156; 310/162
[58] Field of Search ................. 310/49, 80, 90, 49, 310/40 MM, 51, 156, 162

[56] References Cited

U.S. PATENT DOCUMENTS

| | | | |
|---|---|---|---|
| 3,949,251 | 4/1976 | Takatsuki | 310/90 |
| 4,006,375 | 2/1977 | Lyman et al. | 310/49 R |
| 4,185,214 | 1/1980 | Gerber et al. | 310/90 |
| 4,201,929 | 5/1980 | Sudler et al. | 310/49 R |
| 4,206,375 | 6/1980 | Sudler | 310/49 R |

Primary Examiner—J. D. Miller
Assistant Examiner—Donald Rebsch
Attorney, Agent, or Firm—Strimbeck, Davis & Soloway

[57] ABSTRACT

The present invention concerns a miniature stepping motor 10 for a watch movement comprising a rotor 12 and a stator 11 pierced with a circular opening in which the rotor is located. A reinforcing band 18 surrounds the rotor concentrically and is pressed into the circular opening of the stator. This band 18 consists of a hollow cylindrical part 19 and an annular part 20 which closes at least partially the tubular piece constituting the band 18. A central opening in the annular part 20 provides a housing for the bearing 16 of the rotor axle.

This band ensures a double function: that of making the stator rigid and that of centering the rotor.

2 Claims, 1 Drawing Figure

U.S. Patent   Aug. 3, 1982   4,342,930
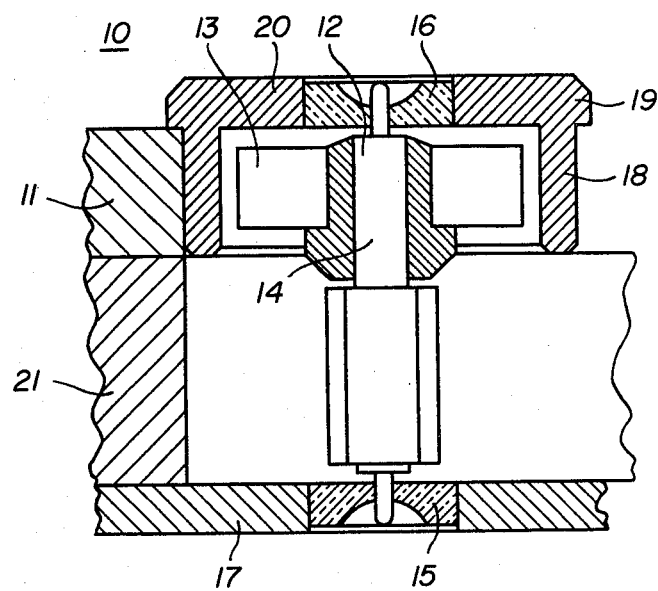

STEP-BY-STEP MINIATURE MOTOR FOR WATCH MOVEMENT

The instant invention concerns the kinematic chain of a quartz analogue watch, and more particularly to the stepping motor of such a watch.

Miniature stepping motors of watches presently known, consisting of a rotor integral with a rotating axle and a stator pierced with a circular opening in which the rotor is housed, generally include a reinforcing band made up of a cylindrical sleeve pressed into the circular opening and whose function is to render the stator rigid.

The instant invention proposes to make a reinforcing band designed to assume a double function: the first function consisting of making the stator rigid and simultaneously, the second function consisting of centering the rotor.

This goal is achieved by virtue of the present invention by the realization of a miniature stepping motor for watch movement, composed of a rotor dependent upon a rotating axis and a stator pierced with a circular opening in which the rotor is housed, characterized by the stator having a reinforcing band consisting of a tubular element at least partially closed at one of its ends, composed of a cylindrical lateral wall and a flat base, this element being pressed, concentrically with the stator, into the circular opening.

According to a preferred embodiment, the base of the tubular element includes a central opening into which one bearing of the rotor axle is pressed. The said tubular element is preferably made of one piece by a cutting operation from a block of non-magnetic material.

The present invention will be better understood with reference to the description of an example of one embodiment and to the attached drawing, in which:

The sole FIGURE represents a transverse cross-section view of the stepping motor according to the invention.

Referring to the FIGURE, the motor 10 shown consists of a stator 11, a rotor 12 bearing the magnet 13 of the motor. The stator 11 is mounted on the plate 21 and the axle of the rotor 14 is supported by two bearings 15 and 16, of which one, bearing 15, is pressed into a circular opening disposed in the bridge 17 and the other, into a circular opening in the inner wall at the base of reinforcing band 18.

This reinforcing band, preferably made from one piece by cutting it from a block of non-magnetic material, appears as one tubular piece which is at least partially closed at one of its ends and is composed of a hollow cylindrical piece 19 in the shape of a cylindrical sleeve, similar to reinforcing bands presently in use, and of an annular piece 20 which forms the base of the tubular piece. The base has a central opening into watch the bearing 16 is pressed.

The reinforcing band is pressed into an appropriate opening disposed in the stator. It fulfills two main functions which are: on the one hand, serving to make the stator rigid and on the other hand, enabling the centering of the rotor axle.

This solution permits a certain number of advantages as follows:
 to enable a two-fold function using a single piece which is indispensible in any case;
 to enable the positioning of the rotor in relation to the stator independently of the stator support;
 to allow placement of the entire kinematic chain of a watch on the side of the watch face, which also facilitates assembly and isolates the gears while protecting them from dust or any foreign particles.

Naturally the reinforcing band of the stepping motor of this invention is not limited to the specific design represented in the FIGURE. It can be modified in design and in dimension as long as the two parts from which it is composed and which enable its two-fold function are maintained.

I claim:

1. A miniature stepping motor for watch movement, consisting of a rotor integral with a rotating axle, a stator pierced with a circular opening in which the rotor is housed, and a stator reinforcing band and rotor bearing support member, disposed between the stator and the rotor, made up of a tubular element at least partially closed at one of its ends, composed of a lateral cylindrical wall and a flat base, this element being pressed into the circular opening concentrically within the stator, the base of the said tubular element having a central opening disposed to house a bearing for the rotor axle.

2. A motor according to claim 1 wherein the said reinforcing band is made in one piece by cutting from a block of non-magnetic material.

* * * * *